United States Patent [19]
Primeaux, II et al.

[11] Patent Number: 5,616,677
[45] Date of Patent: Apr. 1, 1997

[54] PREPARATION OF SPRAYABLE ALIPHATIC POLYUREA ELASTOMERS HAVING IMPROVED PROPERTIES

[75] Inventors: Dudley J. Primeaux, II, Elgin; Robert L. Zimmerman, Austin, both of Tex.

[73] Assignee: Huntsman Petrochemical Corporation, Salt Lake City, Utah

[21] Appl. No.: 579,473

[22] Filed: Dec. 27, 1995

Related U.S. Application Data

[63] Continuation of Ser. No. 265,537, Jun. 24, 1994, abandoned.
[51] Int. Cl.$^6$ .................................................. C08G 18/32
[52] U.S. Cl. ........................... 528/66; 528/73; 528/76; 528/78; 528/85; 521/163; 521/164; 521/170; 521/174
[58] Field of Search ................................ 528/66, 73, 76, 528/78, 85; 521/163, 164, 170, 174

[56] References Cited

U.S. PATENT DOCUMENTS

| | | | |
|---|---|---|---|
| 3,194,773 | 7/1965 | Hostettler | 260/2.5 |
| 3,654,370 | 4/1972 | Yeakey | 260/584 B |
| 3,666,788 | 5/1972 | Rowton | 260/465.5 R |
| 3,714,128 | 1/1973 | Rowton et al. | 260/77.5 |
| 4,465,713 | 8/1984 | Lock et al. | 427/385.5 |
| 4,705,814 | 11/1987 | Grigsby et al. | 521/159 |
| 4,732,919 | 5/1988 | Grigsby et al. | 521/159 |
| 4,748,192 | 5/1988 | Smith | 521/107 |
| 5,013,813 | 5/1991 | Zimmerman et al. | 528/60 |
| 5,140,090 | 8/1992 | Champion et al. | 528/60 |
| 5,162,388 | 10/1992 | Primeaux, II | 521/159 |
| 5,171,818 | 12/1992 | Wilson | 528/59 |

OTHER PUBLICATIONS

Rowton, R.L, "Cyanoethylated Polyoxypropylenepolyamines: Polymer Formers of Unique Reactivity," *Journal of Elastomers and Plastics*, vol. 9 (Oct. 1977), pp. 365–375.

*Primary Examiner*—Samuel A. Acquah
*Attorney, Agent, or Firm*—Russell R. Stolle; Ron D. Brown

[57] ABSTRACT

This invention discloses an aliphatic spray polyurea elastomer comprising an (A) component that includes an aliphatic isocyanate and a (B) component that includes (1) an amine-terminated polyoxyalkylene polyol and (2) a cycloaliphatic diamine chain extender, wherein between about 20% to about 80% of the primary amines have been converted into secondary amines.

13 Claims, No Drawings

5,616,677

PREPARATION OF SPRAYABLE ALIPHATIC POLYUREA ELASTOMERS HAVING IMPROVED PROPERTIES

This application is a continuation of application Ser. No. 08/265,537, filed Jun. 24, 1994, now abandoned.

BACKGROUND OF THE INVENTION

1. Field of the Invention

This invention relates to aliphatic polyurea elastomer systems.

2. Background Information

Polyurea elastomer systems are commonly recognized as suitable for coating materials, with sprayable polyurea elastomer systems being particularly useful when employed in this capacity. One of the shortcomings associated with aromatic polyurea elastomer systems, which generally are prepared by reacting an aromatic isocyanate with an active hydrogen component in the presence of an aromatic chain extender, is that they exhibit poor stability when exposed to ultraviolet radiation. This becomes particularly problematic when the substrate to be coated is continuously subjected to ultraviolet exposure, as is the case, for example, with a rooftop. The resulting ultraviolet degradation of the elastomer system typically is manifested by a change in color; a general loss of product integrity, such as cracking; and an adverse reduction in properties, such as tensile strength, tear strength and elongation, to name a few.

The most widely employed aromatic chain extender is diethylenetoluenediamine (DETDA). In addition to providing an ultraviolet unstable system, DETDA provides a rigid elastomer system which, because of its rigidity, has difficulty in assuming the detail or contour of the substrate to be coated. However, polyurea elastomer systems fabricated from, among other things, DETDA generally exhibit good processing characteristics. Thus, there is a recognized need for a polyurea elastomer system that exhibits ultraviolet stability and increased flexibility, i.e., less rigidity, while exhibiting good processing characteristics.

It is known to increase ultraviolet stability by using non-aromatic, i.e. aliphatic, active hydrogen components. For instance, Rowton, in "Cyanoethylated Polyoxypropylene polyamines: Polymer Formers of Unique Reactivity", Journal of Elastomers and Plastics, Vol. 9, October 1977, describes the use of cyanoethylated polyoxypropylene polyamines as the active hydrogen component in polyurea systems to provide light stable systems. But Rowton is silent with respect to employing aliphatic chain extenders.

In previous two-component aliphatic polyurea elastomer processes, low molecular weight polyoxyalkylene polyamines and cycloaliphatic diamines have been used quite successfully as chain extenders.

Previously known primary amine aliphatic chain extenders include trans-1, 4-diaminocyclohexane; 1,2-diaminocyclohexane; and 1,6-diaminohexane. These and other previously known primary amine aliphatic chain extenders work well, but because they react very rapidly with isocyanate, they are difficult to use in spray systems, inasmuch as polymerization occurs so rapidly that the polymer can be virtually unsprayable. Other previously known low molecular weight, linear primary amine chain extenders exhibit a rapid reactivity that result in poor mixing and elastomer cure. Previously known secondary amine aliphatic chain extenders, i.e. sym-dialkylethylenediamines, are too slow for practical, commercial applications. Additionally, elastomer systems prepared with previously known aliphatic chain extenders have exhibited processing characteristics notoriously inferior to those exhibited by systems fabricated from DETDA.

Several attempts have been made to develop polyurea elastomers and process using aliphatic chain extenders. Commonly assigned U.S. patent application Ser. No. 07/402,296, filed Sep. 5, 1989, now abandoned in favor of U.S. patent application Ser. No. 08/117,962, filed Sep. 7, 1993, describes aliphatic spray polyurea elastomers comprising an (A) component that includes an aliphatic isocyanate and a (B) component that includes (1) an amine-terminated polyoxyalkylene polyol, and (2) an amine-terminated aliphatic chain extender.

In addition applicant has previously discovered that the properties and processing characteristics of sprayable polyurea elastomers may be improved by using a cycloaliphatic diamine chain extender selected from the group including cis-1,4-diaminocyclohexane; isophoronediamine; m-xylylenediamine; 4,4'-methylenedicyclohexylamine; methanediamine; 1,4-diaminoethyl-cyclohexane; and alkyl-substituted derivatives thereof, as disclosed in commonly assigned U.S. Pat. No. 5,162,388.

SUMMARY OF THE INVENTION

This invention relates to a process for preparing a sprayable polyurea elastomer. The elastomer is prepared by reacting an aliphatic isocyanate with an amine-terminated polyoxyalkylene polyol in the presence of a cycloaliphatic diamine chain extender, and wherein about 20% to about 80% of the amine groups of the cycloaliphatic diamine chain extender are secondary amines. This invention further relates to a sprayable polyurea elastomer, prepared by reacting at least one aliphatic isocyanate with at least one amine-terminated polyoxyalkylene polyol in the presence of a cycloaliphatic diamine chain extender, wherein about 40% to about 60% of the amine groups of the cycloaliphatic diamine chain extender are secondary amines, and wherein the cycloaliphatic diamine is selected from the group consisting of cis-1,4-diaminocyclohexane; isophoronediamine; m-xylylenediamine; 4,4'-methylenedicyclohexylamine; methanediamine; 1,4-diaminoethylcyclohexane; and substituted derivatives thereof.

The cycloaliphatic diamine chain extenders of the present invention provide the requisite reactivity to yield good cure and good spray processing characteristics, while avoiding the problems associated with the highly reactive primary amine chain extenders of the prior art. Moreover, the polyurea elastomers produced in accordance with the present invention are ultraviolet stable and exhibits improved flexibility so that it can be effectively sprayed onto even the most intricately shaped substrate.

DESCRIPTION OF THE PREFERRED EMBODIMENTS

The present invention relates to the use of aliphatic diamine chain extenders to produce aliphatic polyurea elastomers having surprisingly improved characteristics and properties. The aliphatic chain extenders of the present invention comprise aliphatic diamines having both primary and secondary amines. The resulting system reactivities are significantly slower than previous systems that use cycloaliphatic amine chain extenders having predominately primary amines; however, the resulting system reactivities provide excellent cure properties to the elastomer system.

The desired chain extender can be produced from previously known primary amine cycloaliphatic diamines, such as isophorone diamine (hereinafter referred to as "IPDA"), by converting some of the primary amine groups to secondary amines. For example, an IPDA having both primary and secondary amines can be produced in a reaction with a dialkyl ketone, preferably acetone, and then reducing the product. This amine chain extender has improved reactivity and cure performance in sprayable aliphatic polyurea elastomer systems.

The reaction of the cycloaliphatic diamine with the dialkyl ketone may be carried out at from about 80° C. to about 210° C. and from about 25 psig to about 3000 psig. A preferred range for the reaction is from about 110° C. to about 160° C. and from about 100 psig to about 2000 psig. An especially preferred range for the reaction is from about 120° C. to about 140° C. and from about 100 psig to about 1500 psig. In addition, one mole or less of the dialkyl ketone should be used per mole of cycloaliphatic diamine.

The preferred cycloaliphatic diamines are those selected from the group consisting of cis-1,4-diaminocyclohexane; isophoronediamine; m-xylylenediamine; 4,4'-methylenedicyclohexylamine; methanediamine; 1,4-diaminomethylcyclohexane; substituted derivatives thereof; and mixtures thereof. Laromine® C-260, available from BASF Corp., is representative of an alkyl-substituted 4,4'methylenedicyclohexylamine derivative. In a more preferred embodiment, the cycloaliphatic diamine chain-extender of component (B) is isophoronediamine.

The chain-extender of the present invention comprises a cycloaliphatic diamine having both primary and secondary amines. Preferably, about 20% to about 80% of the amine groups of the cycloaliphatic diamine are secondary amines. In a more preferred embodiment, the cycloaliphatic diamine has between about 40% to about 60% secondary amine groups. In an especially preferred embodiment, the cycloaliphatic diamine has about 50% secondary amine groups. It should be understood that the percentage of secondary amine groups of the cycloaliphatic diamine is determined on the basis of the entire quantity of chain extender used in accordance with the present invention. Some individual molecules of the suitable cycloaliphatic diamines may contain only secondary amines while others may contain only primary amine groups. Example 1 below shows a chain extender having about 47 percent secondary amine groups.

Using the chain extenders of the present inventive process, isophorone diisocyanate may be used. In previously known aliphatic spray polyaurea elastomer systems, only m-tetramethylxylene diisocyanate (m-TMXDI®) could be used, due to its slower reactivity. But using the process of the present invention, physical properties are not adversely affected by the faster reacting isophorone diisocyanate. In fact, physical properties are improved due to the improved mixing characteristics that result from the slower reactivities observed. Improved residual tack also is noted. The materials of the instant invention have exhibited excellent impact resistance at −30° C.

This invention is useful in the preparation of sprayable, aliphatic polyurea elastomers. These systems can be used in protective coatings, "paint" applications, membranes, barrier coatings, road marking coatings, decorative coatings, automotive instrument panel applications, etc. As a result of improved thermal properties, the polyurea elastomer systems of the instant invention produce excellent candidate materials for automotive interior trim applications (e.g., instrument panel skins, door panel skins, air-bag door skins, etc.).

The aliphatic polyurea elastomer systems of the present invention generally include two components, an (A) component and a (B) component. In particular, the (A) component comprises an aliphatic isocyanate. The aliphatic isocyanates employed in component (A) are those known to one skilled in the art of polyurea and polyurethane elastomers and foams. Thus, for instance, the aliphatic isocyanates are of the type described in U.S. Pat. No. 4,748,192, the entire content of which is incorporated herein by reference. Accordingly, they are typically aliphatic diisocyanates and, more particularly, are the trimerized or the biuretic form of an aliphatic diisocyanate, such as hexamethylene diisocyanate, or the bifunctional monomer of the tetraalkyl xylylene diisocyanate, such as the tetramethyl xylylene diisocyanate. Cyclohexane diisocyanate also is considered a preferred aliphatic isocyanate. Other useful aliphatic polyisocyanates are described in U.S. Pat. No. 4,705,814, the entire content of which is incorporated herein by reference. They include aliphatic diisocyanates, for example, alkylene diisocyanates with 4 to 12 carbon atoms in the alkylene radical, such as 1,12-dodecane diisocyanate and 1,4-tetramethylene diisocyanate. Also useful are cycloaliphatic diisocyanates, such as 1,3- and 1,4-cyclohexane diisocyanate, as well as any desired mixture of the following isomers: 1-isocyanato-3,3,5-trimethyl-5-isocyanatomethylcyclohexane(isophorone diisocyanate); 4,4'-, 2,2'- and 2,4'-dicyclohexylmethane diisocyanate; as well as corresponding isomer mixtures, and the like. The aforementioned isocyanates can be used alone or in combination.

It is to be understood that the term "aliphatic isocyanate" also includes quasiprepolymers of aliphatic isocyanates with active hydrogen-containing materials. The active hydrogen-containing materials can include a polyol or a high molecular weight amine-terminated polyoxyalkylene polyol, also described herein as amine-terminated polyethers, or a combination of these materials.

The polyols include polyether polyols, polyester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethylene oxide, propylene oxide, butylene oxide, or mixtures of propylene oxide, butylene oxide and/or ethylene oxide. Other high molecular weight polyols that may be useful in this invention are polyesters of hydroxyl-terminated rubbers, e.g., hydroxyl-terminated polybutadiene. Hydroxyl-terminated quasi-prepolymers of polyols and isocyanates also are useful in this invention.

Especially preferred are amine-terminated polyether polyols, including primary and secondary amine-terminated polyether polyols of greater than 1,500 average molecular weight, having a functionality of from about 2 to about 6, preferably from about 2 to about 3, and an amine equivalent weight of from about 750 to about 4,000. Mixtures of amine-terminated polyethers may be used. In a preferred embodiment, the amine-terminated polyethers have an average molecular weight of at least about 2,500. These materials may be made by various methods known in the art.

The amine-terminated polyether resins useful in this invention are, for example, polyether resins made from an appropriate initiator to which lower alkylene oxides, such as ethylene oxide, propylene oxide, butylene oxide, or mixtures thereof, are added with the resulting hydroxyl-terminated polyol then being aminated. When two or more oxides are used, they may be present as random mixtures or as blocks of one or the other polyether. In the amination step, it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in a preferred embodiment, the amine-terminated polyether resins useful in this invention have greater than 50 percent of their active hydrogens in the form of amine hydrogens. If ethylene oxide is used, it is desirable to cap the hydroxyl-terminated polyol with a small amount of higher alkylene oxide to ensure that the terminal hydroxyl groups are essentially all secondary hydroxyl groups. The polyols so prepared are then reductively aminated by known techniques, such as described in U.S. Pat. No. 3,654,370, for example, the entire content of which is incorporated herein by reference.

In the practice of this invention, a single high molecular weight amine-terminated polyol may be used. Also, mixtures of high molecular weight amine-terminated polyols, such as mixtures of di- and trifunctional materials, and/or materials having different molecular weights or different chemical compositions, may be used. Also, high molecular weight amine-terminated polyethers and simple polyether amines are included within the scope of this invention, and may be used alone or in combination with the aforementioned polyols. The term "high molecular weight" is intended to include polyether amines having a molecular weight of at least about 2,000. Particularly preferred are the JEFFAMINE® brand series of polyether amines available from Huntsman Specialty Chemicals Corp.; they include JEFFAMINE D-2000, JEFFAMINE D-4000, JEFFAMINE T-3000 and JEFFAMINE T-5000. These polyether amines are described with particularity in Huntsman Specialty Chemicals Corp.'s product brochure entitled "The JEFFAMINE® Polyoxyalkyleneamines".

The (B) component of the present polyurea elastomer system comprises an amine- terminated polyoxyalkylene polyol and certain cycloaliphatic diamine chain extenders. The amine-terminated polyoxyalkylene polyol preferably is selected from diols or triols and, most preferably, includes a blend of diols and/or triols. The particular polyols, i.e., diols and/or triols, employed in component (B) are the same as those described hereinabove in connection with the quasi-prepolymer of component (A).

In the cycloaliphatic diamine chain-extender of component (B) has been described hereinabove. Preferably, about 20% to about 80% of the amine groups of the cycloaliphatic diamine chain-extender are secondary amines. These cycloaliphatic diamine chain-extenders give the elastomer system the requisite activity to yield good cure and good spray processing characteristics. Additionally, the thus formed aliphatic system is ultraviolet stable and exhibits improved flexibility so that it can be effectively sprayed onto even the most intricately shaped substrate. Preferably, the spray elastomer system has an effective gel time greater than about 4 seconds.

Other conventional formulation ingredients may be employed in component (A) or (B) as needed, such as, for example, foam stabilizers, also known as silicone oils or emulsifiers. The foam stabilizers may be an organic silane or siloxane. For example, compounds may be used having the formula:

$$RSi[O—(R_2SiO)_n(oxyalkylene)_mR]_3$$

wherein R is an alkyl group containing from 1 to 4 carbon atoms; n is an integer of from 4 to 8; m is an integer of from 20 to 40, and the oxyalkylene groups are derived from propylene oxide and ethylene oxide. See, for example, U.S. Pat. No. 3,194,773, the entire content of which is incorporated herein by reference. Pigments, for example, titanium dioxide, may be incorporated in the elastomer system., preferably in the (B) component, to impart color properties to the elastomer.

Reinforcing materials, if desired, that are useful in the practice of this invention are known to those skilled in the art. For example, chopped or milled glass fibers, chopped or milled carbon fibers, and/or other mineral fibers are useful.

Post curing of the elastomer of the invention is optional. Post curing will improve some elastomeric properties, such as heat sag. Employment of post curing depends on the desired properties of the end product.

The (A) component and (B) component of the present polyurea elastomer system are combined or mixed under high pressure; most preferably, they are impingement mixed directly in the high pressure spray equipment which may be, for example, a GUSMER® VR-H-3000 proportioner fitted with a GUSMER Model GX-7 spray gun. In particular, a first and second pressurized stream of components (A) and (B), respectively, are delivered from two separate chambers of the proportioner and are impacted or impinged upon each other at high velocity to effectuate an intimate mixing of the two components and, thus, the formation of the elastomer system, which is then coated onto the desired substrate via the spray gun. The volumetric ratio of the (A) component to the (B) component is generally from about 30 to about 70 percent to about 70 to about 30 percent. Preferably, component (A) and component (B) are employed in a 1:1 volumetric ratio.

While the aliphatic polyurea elastomers of the present invention also are useful in reaction injection molding (RIM) systems, it should be noted that the advantage provided by the present invention is more noteworthy in spray systems, relative to other elastomer systems where sprayability is not at issue, such as in RIM systems. Advantageously, the (A) and (B) components react to form the present elastomer system without the aid of a catalyst.

The incorporation of a UV stabilizer/antioxidant package can improve the durability of the materials of the present invention such that they surpass the currently used PVC systems for automotive interior trim pieces. The preferred UV stabilizer additives include bis-(1,2,2,6,6-pentamethyl-4-piperidinyl)sebacate, known as TINUVIN® 765, and 2-(2'-hydroxy-3,5'-di-tert-amylphenyl)benzotriazole, known as TINUVIN 328. The preferred antioxidant additive is 3,5-di-tert-butyl-4-hydroxyhydrocinnamate, known as IRGANOX® 1076. The additive mixture preferably contains about 40% bis-(1,2,2,6,6-pentamethyl- 4-piperidinyl)sebacate, about 40% 2-(2'-hydroxy-3', 5'-di-ter-tamylphenyl)benzotriazole, and about 20% 3,5-di-tert-butyl-4-hydroxyhydrocinnamate.

The following examples are merely illustrative and should not be construed as limitations on the scope of the claims.

| GLOSSARY OF TERMS AND MATERIALS | |
| --- | --- |
| JEFFAMINE ® T-5000 | Polypropylene oxide triamine of about 5000 molecular weight; a product of Huntsman Specialty Chemicals Corp.. |
| JEFFAMINE T-3000 | Polypropylene oxide triamine of about 3000 molecular weight; a product of Huntsman Specialty Chemicals Corp.. |
| JEFFAMINE D-4000 | Polypropylene oxide diamine of about 4000 molecular weight; a product of Huntsman Specialty Chemicals Corp.. |
| JEFFAMINE D-2000 | Polypropylene oxide diamine of about 2000 molecular weight; a product of Huntsman Specialty Chemicals Corp.. |
| JEFFAMINE T-403 | Polypropylene oxide triamine of about 430 molecular weight; a product of Huntsman Specialty Chemicals Corp.. |
| JEFFAMINE D-400 | Polypropylene oxide diamine of about 400 molecular weight; a product of Huntsman Specialty Chemicals Corp.. |
| JEFFAMINE D-230 | Polypropylene oxide diamine of about 230 molecular weight; a product of Huntsman Specialty Chemicals Corp.. |
| m-TMXDI ® | m-tetramethylxylene diisocyanate from Cytek Industries (American Cyanamid). |
| VESTAMIN ® IPD | Isophorone diamine from Huls America. |
| VESTAMIN A-139 | Blocked isophorone diamine from Huls America. |
| TIPURE ® R-900 | Titanium dioxide from Dupont. |
| TINUVIN ® 765 | bis-(1,2,2,6,6-pentamethyl-4-piperidinyl)sebacate from Ciba-Geigy corporation. |
| TINUVIN 328 | 2-(2'-hydroxy-3',5'-di-tert-amylphenyl)benzotriazole from Ciba-Geigy corporation. |
| IRGANOX ® 1076 | 3,5-di-tert-butyl-4-hydroxyhydrocinnamate from Ciba-Geigy corporation. |
| GUSMER ® VR-H-3000 | Proportioning unit (plural component). |

EXAMPLES 1–2

Preparation of Amine Chain Extenders: Preparation of N-Isopropyl-isophoronediamine/Isophoronediamine Mixtures 1:1 Mole Ration of Acetone: IPDA (Experimental Amine #1, also referred to as Amine #1)

To a 3 gallon autoclave were charged 100 g of a Ni-Co-Cu catalyst, 1 gallon of isopropanol, and 1830 g of isophoronediamine. The clave was pressurized to 100 psig with hydrogen, then heated to 130° C. The pressure was increased to 1000 psig with hydrogen, and the addition of 624 g of acetone was started. The acetone was added in eight equal portions over a 4 hour period. The reaction was held at 1000 psig and 130° C. for 2 hours, then cooled and discharged. The catalyst was removed by filtration, and the solvent removed under reduced pressure. Analysis of the product:

| Total amine | 9.35 meq/g |
| --- | --- |
| Primary amine | 5.00 meq/g |
| Water content | 0.02 wt % |

The resulting experimental cycloaliphatic amine-terminated chain extender has a molecular weight of 194.

0.5:1 Mole Ratio of Acetone:IPDA (Experimental Amine #2, also referred to as Amine #2)

The same procedure as above was used with the following charges:

| IPDA | 3386 g |
| --- | --- |
| Acetone | 577 g |
| Isopropanol | 2 qts |
| Catalyst | 100 g |

Analysis of the product:

| Total amine | 10.22 meq/g |
| --- | --- |
| Primary amine | 7.87 meq/g |
| Water content | 0.13 wt % |

Spray Work

For all the spray work described in these examples, a GUSMER® VR-H-3000 Proportioning unit (plural component) was used, fitted with a GUSMER GX-7-400 spray gun. The equipment was set so as to process each example at an isocyanate to resin blend volume ratio of 1.00 (1.00 weight ratio). Spray processing pressure was maintained at 1500 psi to 2500 psi on both the isocyanate and resin blend components. Block heat, as well as hose heat, was set at 160° F.

EXAMPLE 3

This spray polyurea application used a system with the A-Component, a quasiprepolymer of m-TMXDI® , 50 parts; and JEFFAMINE® D-2000, 50 parts; reacted with a B-component (resin bed), a blend of JEFFAMINE T-3000, 10.0 parts; JEFFAMINE D-2000, 58.6 parts; Experimental Amine #1, 27.4 parts; and TiPure® R-900 (titanium dioxide), 4.0 parts. The resulting aliphatic polyurea elastomer had an effective gel time of 40 seconds, with a tack free time of approximately 3 minutes. Some foaming of the elastomer was noted and physical properties were not determined.

EXAMPLE 4

This example used a system with the A-component, a quasi-prepolymer of isophorone diisocyanate, 45 parts; and JEFFAMINE D-2000, 55 parts. This component was mixed with the same B-component as mentioned in Example 3. The resulting aliphatic polyurea elastomer had an effective gel time of 20 seconds, with a tack free time of 60 seconds. No foaming was noted in the elastomer.

EXAMPLE 5

This example used a system with the same A-component (isocyanate quasiprepolymer) as mentioned in Example 3.

The B-component used was a blend of JEFFAMINE D-3000, 10.0 parts; JEFFAMINE D-2000, 60.8 parts; VESTAMIN® IPD (isophorone diamine), 12.45 parts; Experimental Amine #1, 12.45 parts; and TiPure R-900, 4.0 parts. The resulting aliphatic polyurea elastomer had an effective gel time of 8 seconds, with a tack free time of 20 seconds. No foaming was noted in the elastomer.

EXAMPLE 6

This comparison example used a system with the same A-component (isocyanate quasi-prepolymer) as mentioned in Example 3. The B-component used was a blend of JEFFAMINE T-3000, 10.0 parts; JEFFAMINE D-2000, 63.8 parts; VESTAMIN® IPD (isophorone diamine), 22.2 parts; and TiPure R-900, 4.0 parts. The resulting aliphatic polyurea elastomer had an effective gel time of 1.5 seconds, with a tack free time of <5 seconds. No foaming was noted in the elastomer.

EXAMPLE 7

This comparison example used a system with the same A-component (isocyanate quasi-prepolymer) as mentioned in Example 4. The B-component used was the same as that mentioned in Example 6. Reactivity of this system was instant, with no acceptable elastomer being prepared.

TABLE I

| Example | 3 | 4 | 5 | 6 | 7 |
|---|---|---|---|---|---|
| Isocyanate quasi-prepolymer | | | | | |
| m-TMXDI® | 50 | — | 50 | 50 | — |
| IPDI | — | 45 | — | — | 45 |
| JEFFAMINE® D2000 | 50 | 55 | 50 | 50 | 55 |
| NCO, % | 14.7 | 14.8 | 14.7 | 14.7 | 14.8 |
| Resin blends | | | | | |
| JEFFAMINE® D2000 | 58.6 | 58.6 | 60.8 | 63.8 | 63.8 |
| JEFFAMINE® T3000 | 10.0 | 10.0 | 10.3 | 10.0 | 10.0 |
| VESTAMIN® IPD | — | — | 12.45 | 22.2 | 22.2 |
| Amine #1 | 27.4 | 27.4 | 12.45 | — | — |
| TiPure® R-900 | 4.0 | 4.0 | 4.0 | 4.0 | 4.0 |
| Processsing | | | | | |
| INDEX | 1.07 | 1.08 | 1.07 | 1.07 | 1.08 |
| Iso/Res vol ratio | 1.00 | 1.00 | 1.00 | 1.00 | 1.00 |
| Effective "gel" time, sec | 40 | 20 | 8 | 1.5 | <1.0 |
| Tack free, sec | 180 | 60 | 20 | <5.0 | <1.0 |
| Physical properties | | | | | |
| Tensile strength, psi | NR | 850 | 1020 | 1085 | NR |
| Elongation, % | NR | 425 | 495 | 485 | NR |
| Tear strength, pli | NR | 270 | 295 | 295 | NR |
| Shore D Hardness | NR | 36 | 35 | 32 | NR |
| 100% Modulus, psi | NR | 570 | 625 | 665 | NR |
| 300% Modulus, psi | NR | 765 | 815 | 865 | NR |

NR — Not reported (not tested)
IPDI — isophorone diisocyanate

EXAMPLE 8

This example used a system with the A-component, a quasi-prepolymer of m-TMXDI®, 50 parts; and JEFFAMINE® D-2000, 50 parts; reacted with a B-Component (resin blend), a blend of JEFFAMINE T-3000, 10.0 parts; JEFFAMINE D-2000, 60.8 parts; Experimental Amine #2, 25.2 parts; and TiPure ® R-900 (titanium dioxide), 4.0 parts. The resulting aliphatic polyurea elastomer had an effective gel time of 7 seconds, with a tack free time of approximately 20 seconds. Formulation and elastomer physical properties are detailed in Table II.

EXAMPLE 9

This example used a system with the same A-component (isocyanate quasi-prepolymer) as mentioned in Example 8. The B-Component used was a blend of JEFFAMINE T-3000, 10.0 parts; JEFFAMINE D-2000, 62.4 parts; VESTAMIN IPD, 11.8 parts; Experimental Amine #2, 11.8 parts; and TiPure R-900, 4.0 parts. The resulting aliphatic polyurea elastomer had an effective gel time of 5 seconds, with a tack free time of 10 seconds. No foaming was noted in the elastomer. Formulation and elastomer physical properties are detailed in Table II.

TABLE II

| Example | 8 | 9 |
|---|---|---|
| Isocyanate quasi-prepolymer | | |
| m-TMXDI ® | 50 | 50 |
| JEFFAMINE ® D-2000 | 50 | 50 |
| NCO, % | 14.7 | 14.7 |
| Resin Blends | | |
| JEFFAMINE ® D-2000 | 60.8 | 62.4 |
| JEFFAMINE ® T-3000 | 10.0 | 10.0 |
| VESTAMIN ® IPD | — | 11.8 |
| Amine #2 | 25.2 | 11.8 |
| TiPure ® R-900 | 4.0 | 4.0 |
| Processing | | |
| INDEX | 1.07 | 1.07 |
| Iso/Res vol ratio | 1.00 | 1.00 |
| Effective "gel" time, sec | 6 | 5 |
| Tack free, sec | 20 | 10 |
| Physical properties | | |
| Tensile strength, psi | 795 | 840 |
| Elongation, % | 547 | 420 |
| Tear strength, pli | 279 | 282 |
| Shore D hardness | 42 | 38 |
| 100% Modulus, psi | 660 | 732 |
| 300% Modulus, psi | 770 | 835 |

EXAMPLE 10

This example used a system with the A-component, a quasi-prepolymer of m-TMXDI®, 45 parts; and JEFFAMINE® D-2000, 55 parts; with a resulting isocyanate content of 12.8%; reacted with a B-component (resin blend), a blend of JEFFAMINE® T-5000, 15.4 parts; JEFFAMINE® D-2000, 61.4 parts; VESTAMIN® IPD, 19.2 parts; and TiPure® R-900, 4.0 parts. The resulting aliphatic polyurea elastomer had an effective gel time of 2.0 seconds with a tack free time of approximately 10 seconds. Formulation and elastomer physical properties are detailed in Table III. This system was applied to a textured steel tool to simulate an instrument panel skin. A sodium oleate based mold release agent was applied to the tool so that the skins could be removed for testing.

EXAMPLE 11

The A-component of Example 10 was used. The B-component used was a blend of JEFFAMINE T-5000, 15.4 parts; JEFFAMINE D-2000, 61.4 parts; VESTAMIN IPD, 19.2 parts; TiPure R-900, 4.0 parts; TINUVIN® 765, 0.48 parts; TINUVIN 328, 0.48; and IRGANOX® 1076, 0.24 parts. The resulting aliphatic polyurea elastomer had an effective gel time of 2 seconds with a tack free time of 10 seconds. Formulation and elastomer physical properties are detailed in Table III. This system was also applied to the same steel tool described in Example 10.

EXAMPLES 12–23

Formulation and elastomer physical property results were obtained in the same manner as in Examples 10 and 11 and are detailed in Tables IV through VII. The A-component of Example 10 was used for each of these Examples (12–23). Included in some of the Examples was the use of an antioxidant/UV stabilizer package. Two UV stabilizers and one antioxidant from Ciba-Geigy were incorporated into the resin blend of half of the aliphatic systems at 1.2 weight % (0.6 wt % in the polymer). The materials used and their ratios were Tinuvin® 765 (40%), Tinuvin® 328 (40%) and Irganox® 1076 (20%). This additive package had little effect on system reactivity and a slight effect on elastomer physical properties.

For Dynamic Mechanical Spectroscopy, a Rheometrics DMS was used and samples characterized at 1 Hz and 0.2% strain over a temperature regime from −100° C. to 250° C.

TABLE III

| Examples | 10 | 11 | 12 | 13 |
|---|---|---|---|---|
| Resin Blends | | | | |
| JEFFAMINE T-5000 | 15.4 | 15.4 | 14.8 | 14.8 |
| JEFFAMINE D-2000 | 61.4 | 61.4 | — | — |
| JEFFAMINE D-4000 | — | — | 59.3 | 59.3 |
| VESTAMIN IPD | 19.2 | 19.2 | 21.9 | 21.9 |
| TiPure R-900 | 4.0 | 4.0 | 4.0 | 4.0 |
| Additive[1] | — | 1.2 | — | 1.2 |
| Processing | | | | |
| Index | 1.05 | 1.05 | 1.05 | 1.05 |
| Iso/Res vol ratio | 1.00 | 1.00 | 1.00 | 1.00 |
| Effective gel time, sec | 1.5 | 1.5 | 1.5 | 1.5 |
| Physical properties | | | | |
| Tensile strength, psi | 1065 | 1365 | 640 | 740 |
| Elongation, % | 560 | 655 | 225 | 385 |
| Tear strength, pli | 280 | 290 | 190 | 225 |
| Shore D Hardness | 33 | 34 | 31 | 32 |
| 100% Modulus, psi | 590 | 600 | 600 | 615 |
| 300% Modulus, psi | 785 | 820 | — | 720 |
| DMS evaluation | | | | |
| Tg, low °C. | −49 | −49 | −55 | −55 |
| Tg, high °C. | 95 | 95 | 123 | 125 |
| Xe Arc evaluation,[2] | | | | |
| appearance | crack | NC | crack | NC |
| Change in Y | +0.49 | −1.95 | +7.37 | +0.39 |
| SAE J-1885 Atlas Sun Test | | | | |
| 488 KJ/m² | fail | pass | fail | pass |
| 1500 KJ/m² | | pass glossy | | pass dull |

NC = No visible change in appearance
[1]Blend of Tinuvin® 765 (40%), Tinuvin 328 (40%) and Irganox® 1076 (20%).
[2]Heraeus SUNTEST CPS, 765 W/m², 700 hours exposure.

TABLE IV

| Examples | 14 | 15 | 16 | 17 |
|---|---|---|---|---|
| Resin Blends | | | | |
| JEFFAMINE T-5000 | 15.1 | 15.1 | 14.5 | 14.5 |
| JEFFAMINE D-2000 | 60.2 | 60.2 | — | — |
| JEFFAMINE D-4000 | — | — | 57.9 | 57.9 |
| VESTAMIN IPD | 10.35 | 10.35 | 11.8 | 11.8 |
| Amine #1 | 10.35 | 10.35 | 11.8 | 11.8 |
| TiPure R-900 | 4.0 | 4.0 | 4.0 | 4.0 |
| Additive[1] | — | 1.2 | — | 1.2 |
| Processing | | | | |
| Index | 1.05 | 1.05 | 1.05 | 1.05 |
| Iso/Res vol ratio | 1.00 | 1.00 | 1.00 | 1.00 |
| Effective gel time, sec | 2.0 | 2.0 | 2.0 | 2.0 |
| Physical properties | | | | |
| Tensile strength, psi | 1010 | 1160 | 635 | 725 |
| Elongation, % | 755 | 730 | 345 | 485 |
| Tear strength, pli | 245 | 255 | 220 | 240 |
| Shore D Hardness | 31 | 33 | 35 | 36 |
| 100% Modulus, psi | 535 | 540 | 555 | 565 |
| 300% Modulus, psi | 700 | 730 | 640 | 665 |
| DMS evaluation | | | | |
| Tg, low °C. | −52 | −49 | −55 | −55 |
| Tg, high °C. | 77 | 84 | 112 | 101 |
| Xe Arc evaluation,[2] | | | | |
| appearance | crack | NC | crack | NC |
| Change in Y | +2.99 | −0.67 | +2.93 | −0.28 |
| SAE J-1885 Atlas Sun Test | | | | |
| 488 KJ/m² | fail | pass | fail | pass |
| 1500 KJ/m² | | pass dull | | pass glossy |

NC = No visible change in appearance
[1]Blend of Tinuvin® 765 (40%), Tinuvin 328 (40%) and Irganox® 1076 (20%).
[2]Heraeus SUNTEST CPS, 765 W/m², 700 hours exposure.

TABLE V

| Examples | 18 | 19 | 20 | 21 |
|---|---|---|---|---|
| Resin Blends | | | | |
| JEFFAMINE T-5000 | 14.7 | 14.7 | 14.1 | 14.1 |
| JEFFAMINE D-2000 | 58.7 | 58.7 | — | — |
| JEFFAMINE D-4000 | — | — | 56.5 | 56.5 |
| Amine #1 | 22.6 | 22.6 | 25.4 | 25.4 |
| TiPure R-900 | 4.0 | 4.0 | 4.0 | 4.0 |
| Additive[1] | — | 1.2 | — | 1.2 |
| Processing | | | | |
| Index | 1.05 | 1.05 | 1.05 | 1.05 |
| Iso/Res vol ratio | 1.00 | 1.00 | 1.00 | 1.00 |
| Effective gel time, sec | 6.6 | 5.9 | 5.5 | 5.6 |
| Physical properties | | | | |
| Tensile strength, psi | 825 | 590 | 745 | 655 |
| Elongation, % | 690 | 550 | 430 | 295 |
| Tear strength, pli | 230 | 185 | 220 | 180 |
| Shore D Hardness | 33 | 32 | 37 | 35 |
| 100% Modulus, psi | 505 | 450 | 610 | 575 |
| 300% Modulus, psi | 635 | 545 | 725 | — |
| DMS evaluation | | | | |
| Tg, low °C. | −49 | −49 | −55 | −55 |
| Tg, high °C. | 75 | 75 | 93 | 92 |
| Xe Arc evaluation,[2] | | | | |

TABLE V-continued

| Examples | 18 | 19 | 20 | 21 |
|---|---|---|---|---|
| appearance | crack | NC | crack | NC |
| Change in Y | +2.42 | +0.51 | +3.31 | +0.36 |
| SAE J-1885 Atlas Sun Test | | | | |
| 488 KJ/m$^2$ | fail | fail | fail | fail |

NC = No visible change in appearance
[1]Blend of Tinuvin ® 765 (40%), Tinuvin 328 (40%) and Irganox ® 1076 (20%).
[2]Heraeus SUNTEST CPS, 765 W/m$^2$, 700 hours exposure.

TABLE VI

| Examples | 22 | 23 |
|---|---|---|
| Resin Blends | | |
| JEFFAMINE T-3000 | 14.8 | 14.2 |
| JEFFAMINE D-2000 | 59.3 | — |
| JEFFAMINE D-4000 | — | 56.9 |
| Amine #1 | 21.8 | 24.8 |
| TiPure R-900 | 4.0 | 4.0 |
| Additive[1] | 1.2 | 1.2 |
| Processing | | |
| Index | 1.05 | 1.05 |
| Iso/Res vol ratio | 1.00 | 1.00 |
| Effective gel time, sec | 13.8 | 8.5 |
| Physical properties | | |
| Tensile strength, psi | 695 | 595 |
| Elongation, % | 695 | 405 |
| Tear strength, pli | 200 | 200 |
| Shore D Hardness | 31 | 36 |
| 100% Modulus, psi | 395 | 520 |
| 300% Modulus, psi | 525 | 520 |
| DMS evaluation | | |
| Tg, low °C. | −49 | −55 |
| Tg, high °C. | 73 | 87 |
| Xe Arc evaluation,[2] | | |
| appearance | NC | NC |
| Change in Y | +2.17 | +0.11 |
| SAE J-1885 Atlas Sun Test | | |
| 488 KJ/m$^2$ | fail | fail |

NC = No visible change in appearance
[1]Blend of Tinuvin ® 765 (40%), Tinuvin 328 (40%) and Irganox ® 1076 (20%).
[2]Heraeus SUNTEST CPS, 765 W/m$^2$, 700 hours exposure.

For Xenon Arc evaluation, a Heraeus SUNTEST CPS Xe Arc was used (DSET Laboratories). The instrument was set such that the samples were exposed to an output of 765 W/m$^2$. A window glass filter was also installed so as to simulate the inside of an automobile. After 700 hour of exposure, the samples were evaluated for physical appearance as well as the "yellowing" index. An X-Rite® 968 Spectrophotometer was used to compare unexposed samples to those exposed in the Xe Arc with respect to yellowing.

Samples were backed with a flexible polyurethane instrument panel foam system for testing. A bulb intensity of 488 W/m$^2$ was used with cycling in humidity, according to SAE J-1885 (Atlas Xe Arc).

After 1993 KJ/m$^2$, only Examples 11 and 15 passed with no polymer degradation. All other Examples passing at 1500 KJ/m$^2$ (Examples 13, 15 and 17) exhibited microscopic cracking but did not fail. All samples were still very flexible. The results of Example 11 and 15 are summarized in Table VII.

It should be noted that the Examples which reached the 1993 KJ/m$^2$, surpass the SAE J-1885 requirements for materials used in automotive interior trim applications.

TABLE VII

| Examples | 11 | 15 |
|---|---|---|
| Resin Blends[1] | | |
| JEFFAMINE T-5000 | 15.4 | 15.1 |
| JEFFAMINE D-2000 | 61.4 | 60.2 |
| VESTAMIN ® IPD | 19.2 | 10.35 |
| Amine #1 | — | 10.35 |
| TiPure R-900 | 4.0 | 4.0 |
| Additive[2] | 1.2 | 1.2 |
| Processing | | |
| Index | 1.05 | 1.05 |
| Iso/Res vol ratio | 1.00 | 1.00 |
| Effective gel time, sec | 1.5 | 2.0 |
| Physical properties | | |
| Tensile strength, psi | 1365 | 1160 |
| Elongation, % | 655 | 730 |
| Tear strength, pli | 290 | 255 |
| Shore D Hardness | 34 | 33 |
| 100% Modulus, psi | 600 | 540 |
| 300% Modulus, psi | 820 | 730 |
| DMS evaluation | | |
| Tg, low °C. | −49 | −49 |
| Tg, high °C. | 95 | 84 |
| Xe Arc evaluation,[3] | | |
| appearance | no cracking or chalking | no cracking or chalking |
| Change in Y | −1.0 | +0.4 |
| SAE J-1885 Atlas Sun Test | | |
| 488 KJ/m$^2$ | pass | pass |
| 1500 KJ/m$^2$ | pass | pass |
| 1993 KJ/m$^2$ | pass | pass |
| | glossy | dull |

[1]Isocyanate quasi-prepolymer of m-TMXDI ® (45%), JEFFAMINE ® D-2000 (55%); NCO = 12.8%.
[2]Blend of Tinuvin ® 765 (40%), Tinuvin 328 (40%) and Irganox ® 1076 (20%).
[3]Heraeus SUNTEST CPS, 765 W/m$^2$, 700 hours exposure.

We claim:

1. A sprayable polyurea elastomer, prepared by reacting at least one aliphatic isocyanate with at least one amine-terminated polyoxyalkylene polyol in the presence of a diamine chain extender, wherein the diamine is selected from the group consisting of cis-,1,4-diaminocyclohexane; isophoronediamine; m-xylylenediamine; 4,4'-methylenedicyclohexylamine; methanediamine; 1,4-diaminaoethylcyclohexane; alkyl substituted derivatives thereof; and mixtures thereof and wherein about 40% to about 60% of primary amine groups of the diamine have been converted to secondary amines.

2. The polyurea elastomer of claim 1 wherein about 50% of the amine groups of the diamine are secondary amines.

3. The polyurea elastomer of claim 1, wherein the diamine is isophoronediamine.

4. The polyurea elastomer of claim 1, wherein the secondary amines of the diamines have been converted from primary amines by reaction with a dialkyl ketone.

5. The polyurea elastomer of claim 4, wherein the volumetric ratio of the aliphatic isocyanate to the sum of the amine-terminated polyoxyalkylene polyol and the cycloaliphatic diamine chain extender is from about 30:70 to about 70:30.

6. The polyurea elastomer of claim 1, wherein the aliphatic isocyanate comprises a quasi-prepolymer of an aliphatic isocyanate and an active hydrogen-containing material.

7. The polyurea elastomer of claim 6, wherein the active hydrogen-containing material is a polyol, a high molecular weight amine-terminated polyoxyalkylene polyol, or a mixture thereof.

8. The polyurea elastomer of claim 6, wherein the active hydrogen-containing material is a polyether polyol selected from the group consisting of: polyols based on a trihydric initiator having a molecular weight of at least about 4000; amine-terminated polyether polyols having an average molecular weight greater than 1500, a functionality of from about 2 to about 6, and an amine equivalent weight of from about 750 to about 4000; and mixtures thereof.

9. A sprayable polyurea elastomer, prepared by reacting at least one aliphatic isocyanate with at least one amine-terminated polyoxyalkylene polyol in the presence of a cycloaliphatic diamine chain extender, wherein about 50% of primary amine groups of the cycloaliphatic diamine have been converted to secondary amines, wherein the cycloaliphatic diamine is iophoronediamine or alkyl substituted derivatives thereof.

10. The polyurea elastomers of claim 9, wherein the resulting polyurea elastomer has an effective gel time of at least about 4 seconds or greater.

11. The polyurea of claim 9, wherein the secondary amine groups of the cycloaliphatic diamine have been converted from primary amines.

12. The polyurea elastomers of claim 9, wherein the volumetric ratio of aliphatic isocyanate to the sum of the amine-terminated polyoxyalkylene polyol and the cycloaliphatic diamine chain extender is from about 30:70 to about 70:30.

13. The polyurea elastomer of claim 9, wherein the aliphatic isocyanate comprises a quasiprepolymer of an aliphatic isocyanate and an active hydrogen-containing material.

\* \* \* \* \*